US008842677B2

(12) United States Patent
Lariviere et al.

(10) Patent No.: US 8,842,677 B2
(45) Date of Patent: Sep. 23, 2014

(54) METHODS AND SYSTEMS FOR PROVIDING A LOGICAL NETWORK LAYER FOR DELIVERY OF INPUT/OUTPUT DATA

(75) Inventors: Robert Lariviere, Boulder Creek, CA (US); Sylvain Joseph Henri Chenard, Gatineau (CA); Gregory Waines, Kanata (CA); Brian Neil Baker, Dunrobin (CA); Guy Mousseau, Gatineau (CA)

(73) Assignee: Rockstar Consortium US LP, Plano, TX (US)

( * ) Notice: Subject to any disclaimer, the term of this patent is extended or adjusted under 35 U.S.C. 154(b) by 253 days.

(21) Appl. No.: 13/256,503

(22) PCT Filed: Mar. 18, 2010

(86) PCT No.: PCT/CA2010/000389
§ 371 (c)(1),
(2), (4) Date: Sep. 14, 2011

(87) PCT Pub. No.: WO2010/105350
PCT Pub. Date: Sep. 23, 2010

(65) Prior Publication Data
US 2012/0002668 A1    Jan. 5, 2012

Related U.S. Application Data

(60) Provisional application No. 61/161,101, filed on Mar. 18, 2009.

(51) Int. Cl.
*H04L 12/28* (2006.01)
*G06F 13/40* (2006.01)

(52) U.S. Cl.
CPC ................ *G06F 13/4022* (2013.01); *G06F 2213/3808* (2013.01)
USPC .................... 370/395.43; 370/416

(58) Field of Classification Search
None
See application file for complete search history.

(56) References Cited

U.S. PATENT DOCUMENTS 7,218,639 B2 * 5/2007 Matsufuru .............. 370/412
2005/0053074 A1    3/2005 Wybenga et al.
(Continued)

FOREIGN PATENT DOCUMENTS

CN    1652528 A    8/2005
CN    1929691 A    3/2007
(Continued)

OTHER PUBLICATIONS

International Search Report and Written Opinion for corresponding PCT Patent Application No. PCT/CA2010/00389, dated Jun. 30, 2010, 7 pages.

(Continued)

*Primary Examiner* — Melanie Jagannathan

(57) ABSTRACT

A method for routing input/output (IO) data in a telecommunication system including a network node having a plurality of first integrated circuit (IC) cards, a plurality of second IC cards and a switching fabric, each second IC card connected to a corresponding first IC card in a respective slot of the network node xs described. The method involves receiving the IO data at an external port of any of the plurality of first or second IC cards. When packets of the IO data are received at an external port of a given second IC card, the given second IC card performs a packet classification of the packets to at least in part determine a destination for the packets. A further step of the method includes delivering the packets to a first or second IC card destination according to the packet classification performed by the given second IC card via a logical network layer existing on the first and second IC cards and the switching fabric. A particular implementation includes use in an Advanced Telecommunication Computing Architecture (ATCA) system.

20 Claims, 11 Drawing Sheets

(56) References Cited

U.S. PATENT DOCUMENTS

| | | |
|---|---|---|
| 2005/0169281 A1 | 8/2005 | Ko et al. |
| 2005/0227505 A1 | 10/2005 | Campini et al. |
| 2005/0243825 A1 | 11/2005 | Bitar et al. |
| 2006/0114923 A1* | 6/2006 | Overgaard ............ 370/425 |
| 2007/0058632 A1 | 3/2007 | Back et al. |
| 2008/0052436 A1 | 2/2008 | Sharma et al. |
| 2008/0279095 A1* | 11/2008 | Gallegos et al. ......... 370/219 |

FOREIGN PATENT DOCUMENTS

| | | |
|---|---|---|
| EP | 1328104 | 7/2003 |
| EP | 1892905 | 2/2008 |
| JP | 2005-513827 | 5/2005 |
| JP | 2005-218106 | 8/2005 |
| WO | 03/013061 | 2/2013 |

OTHER PUBLICATIONS

Supplementary European Search Report for corresponding European Patent Application No. 10753034.7, issued on Jan. 30, 2013, 9 pages.

Office Action, including English-language translation thereof, for corresponding Japanese Patent Application No. 2012-500015, issued on Nov. 15, 2013, 4 pages.

Office Action for corresponding Chinese Patent Application No. 201080012127.5, issued on Oct. 29, 2013, 7 pages.

English-language translation of Office Action for corresponding Chinese Patent Application No. 201080012127.5, issued on Oct. 29, 2013, 12 pages.

* cited by examiner

METHODS AND SYSTEMS FOR PROVIDING A LOGICAL NETWORK LAYER FOR DELIVERY OF INPUT/OUTPUT DATA

RELATED APPLICATIONS

This application claims the benefit of and is a National Phase Entry of International Application Number PCT/CA2010/000389 filed Mar. 18, 2010, and claims the benefit of U.S. Provisional Patent Application No. 61/161,101 filed on Mar. 18, 2009, both of which are hereby incorporated by reference in their entirety.

FIELD OF THE INVENTION

The invention relates to providing a logical network layer for delivery of IO data in a network.

BACKGROUND

In many chassis based systems, multi-core technology is driving a desire for consolidation of different applications and services into single physical systems. These applications and services, once physically separated and networked together are now being integrated into a single chassis with the same security requirements that physical separation provided and the inter-connectivity that the network between them provided for inter-application operability. Examples of these consolidation requirements include WAN connectivity with Virtual Private Networking (VPN) support, network security and storage networking services, connectivity between front-end web applications with back-end database applications. In these examples, there should be both front-end network access security and application level security between application services in the front and back end. At the same time, each tier of services shares a common set of storage devices in a secure and segregated way.

In a particular example of a telecommunications architecture, namely the Advanced Telecommunications Computer Architecture (ACTA), an ATCA chassis solution has developed into a large eco-system of card types and vendors with solutions that address different product areas in the application server and gateway product market spaces. ATCA systems today have developed into large processing farms with product specific Input/Output (IO) delivery methods depending on vendor preferences and product use case requirements. In all cases, the IO delivery architectures lack sufficient standards to cover the necessary flexibility for different product type use cases that the ATCA chassis based solutions cover today. The different IO methods create complexity in the base software developed on these systems and limit the re-use of certain card vendors to meet solutions. Unique software implementations must be created to handle each of the various vendor and product specific implementations.

The current IO infrastructure in an ATCA system must cover external IO traffic from intranet and internet connections, storage traffic involved with shared storage requirements, and low latency inter-processing traffic required for clustering and control of the different processing entities. The current ATCA standards do not define suitable methods for ATCA systems to handle the different traffic types listed. The fabric is designed for inter-processing communications, but lacks methods for mixing external IO and storage requirements for the increased processing demands that are becoming necessary with the evolution of systems with regard to processing and storage, as discussed above. Some vendors use a combination of Advanced Mezzanine Cards (AMC) and Rear Transition Modules (RTM) to carry the storage and external IO traffic. This leads to unusual software methods to implement operable systems. Each card implementation requires its own sets of rules for interconnects and the card type may not meet all the requirements for storage, clustering and external IO traffic for bandwidth requirements as systems continue to evolve.

SUMMARY

According to one aspect of the present invention, there is provided a method for routing input/output (IO) data in a telecommunication system, the system comprising a network node comprising a plurality of first integrated circuit (IC) cards, a plurality of second IC cards and a switching fabric, each second IC card connected to a corresponding first IC card in a respective slot of the network node, the method comprising: receiving the IO data at an external port of any of the plurality of first or second IC cards; when packets of the IO data are received at an external port of any of the plurality of second IC cards: upon receipt of the packets by a given second IC card, the given second IC card performing a packet classification of the packets to at least in part determine a destination for the packets; delivering the packets to a first or second IC card destination according to the packet classification performed by the given second IC card via a logical network layer existing on the first and second IC cards and the switching fabric.

In some embodiments, the method comprises at one or more of any of the first or second IC cards or the switching fabric: receiving the packets in the logical network layer; and offloading the packets to an IO layer for processing or to a processing layer for processing via the IO layer.

In some embodiments, offloading the packets to the IO layer for processing comprises at least one of: offloading the packets to the IO layer to enable virtualized operating environment support with isolated network addressing and protected traffic types through the use of one or more of: networking layer virtual local area networking (VLAN), virtual routing (VR) and policy based forwarding methods; and offloading the packets to the IO layer to enable unification of physical interconnect resources for cluster communications between application services, storage traffic between application and storage devices, and IO traffic between application services and external ports through the use of the network layer.

In some embodiments, the method comprises accessing at least one peripheral device within the network node via the logical networking layer.

In some embodiments, delivering the packets via the logical network layer to a first or second IC card destination comprises at least one of: delivering the packets via at least one of the plurality of first IC cards configured as a switching fabric card; and delivering the packets via a mesh interconnect connecting together two or more of the plurality of first IC cards.

According to another aspect of the present invention, there is provide an integrated circuit (IC) card for use in a rear slot location of a network node having a plurality of slots, each slot comprising a front slot location and rear slot location, the IC card comprising: at least one external port for receiving IO data; at least one internal port for connecting to a corresponding front location slot card or a switching fabric of the network node; a network device configured to perform classification of packets of the IO data to at least in part determine a destination for the packets, the network device configured to communicate with network devices in front slot cards and a switching fabric such that collectively the network devices form a logical network layer for delivering the packets of the IO data to a different front slot card or rear slot card destination according to classification performed by the network device via the logical network layer.

In some embodiments, the IC card further comprises at least one IO device configured to offload packets of the IO data for processing.

In some embodiments, the IO device is configured to perform at least one of encryption; decryption; encapsulation; decapsulation; deep packet inspection; Transmission Control Protocol (TCP); Fiber Channel over Ethernet (FCOE) processing and Internet Small Computer System Interface (iSCSI) processing.

According to still another aspect of the present invention, there is provided an apparatus for routing input/output (IO) data in a telecommunication system comprising: a plurality of first integrated circuit (IC) cards; a plurality of second IC cards; and a switching fabric, each second IC card connected to a first IC card in a slot of the apparatus; wherein at least one of the plurality of second IC cards is configured to receive IO data at an external port; upon receipt of packets of the IO data, the at least one second IC card performing a packet classification of the packets to at least in part determine a destination for the packets; delivering the packets to a first or second IC card destination according to the packet classification via a logical network layer existing on the first and second IC cards and the switching fabric.

In some embodiments, one or more of the first or second IC cards or the switching fabric are configured to: receive the packets in the logical network layer; and offload the packets to an IO layer for processing or to a processing layer for processing via the IO layer.

In some embodiments, at least one of the plurality of second IC cards and at least one of the plurality of first IC cards have a network device that enables delivery of the packets in the logical network layer.

In some embodiments, the switching fabric is comprised of at least one of: at least one of the plurality of first IC cards configured as a switching fabric card; and a mesh interconnect connecting together two or more of the plurality of first IC cards.

In some embodiments, the network node is an Advanced Telecommunications Computing Architecture (ACTA) chassis comprising a plurality of slots configured to receive the plurality of first IC cards and the plurality of second IC cards.

In some embodiments, at least one of the plurality the second IC cards is a Rear Transition Module (RTM) card.

In some embodiments, at least one of the plurality of first IC cards is one of: an application/service card; an IO connector card; and a data storage card.

In some embodiments, a second IC card and a first IC card in the same slot are the same card type and use the logical network layer to deliver packets to other first and second IC cards.

In some embodiments, at least one of the plurality of first IC cards and plurality of second IC cards comprises at least one offload device configured to operate in the IO layer.

In some embodiments, the at least one offload device is configured to perform at least one of: encryption; decryption; encapsulation; decapsulation; deep packet inspection; Transmission Control Protocol (TCP); Fiber Channel over Ethernet (FCOE) processing and internet Small Computer System Interface (iSCSI) processing.

In some embodiments, the network devices are compliant with one or more of: IEEE 802.1p, IEEE 802.1Qua, IEEE 802.az, IEEE 802.1bb, and PCI-E.

In some embodiments, a subset of the plurality of the second IC cards are configured to monitor and debug any IO port, internal or external on any other first or second IC card in the apparatus.

Other aspects and features of the present invention will become apparent to those ordinarily skilled in the art upon review of the following description of specific embodiments of the invention in conjunction with the accompanying figures.

DETAILED DESCRIPTION

Figure 1:
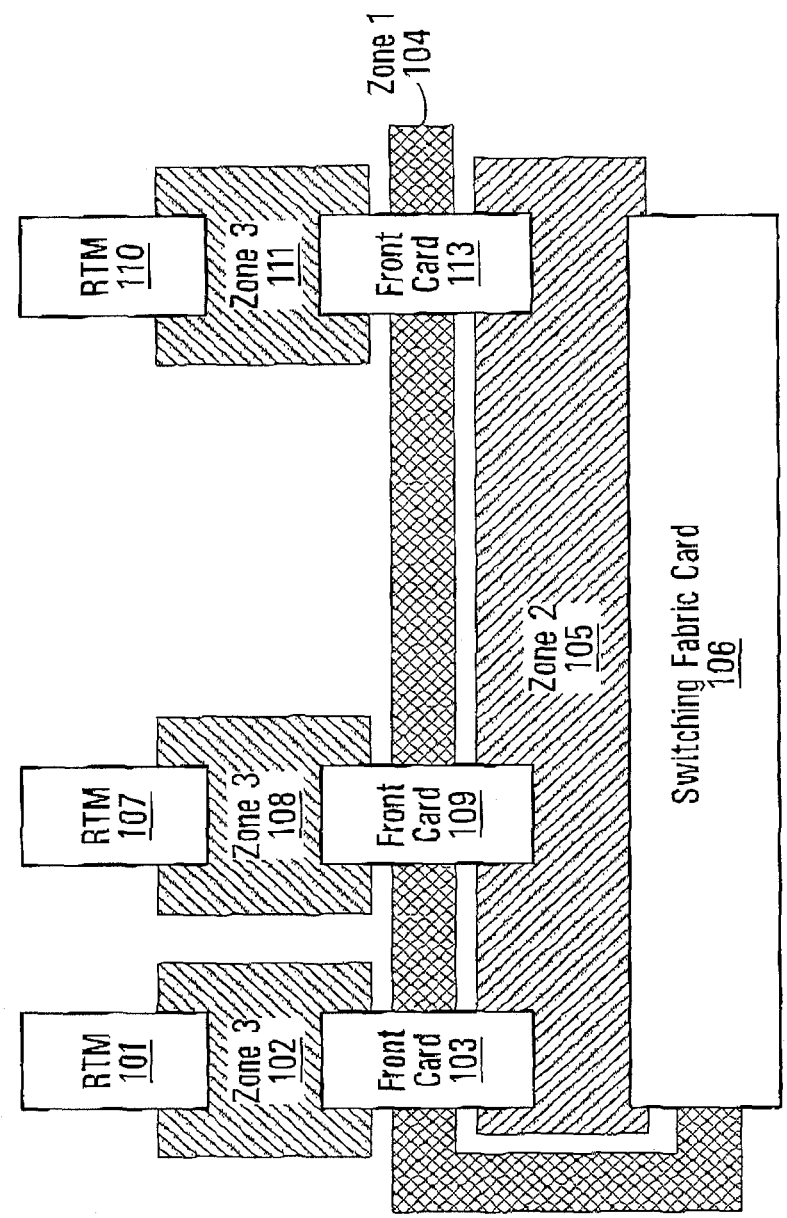
FIG. 1 is a schematic diagram of the backplane connector and interconnect design according to an embodiment of the invention.

In the following description, numerous details are set forth to provide an understanding of various embodiments of the invention. However, it will be understood by those skilled in the art that some embodiments may be practiced without these details and that numerous variations or modifications from the described embodiments may be possible.

While many of the implementations described below pertain to an example of ATCA devices and systems and methods that may be used with those systems and devices, it is to be understood that the general principles underlying those particular implementations may be applicable to other types of devices and systems. An example of other types of devices and systems that may support methods and generalized hardware described herein are devices and systems that support PICMG 2.16.

As discussed above, ATCA solutions deploy vendor specific IO delivery methods that do not permit design reuse across solutions. Some embodiments of the invention described below aid in creating a uniform IO delivery system. In some embodiments a logical network layer is provided across a system by implementing an interconnected set of network devices across the system. In some implementations the system, or a portion of the system, is a chassis including multiple integrated circuit (IC) cards. IC cards in the chassis may be distributed such that, for example, two cards are allocated per slot, in which the chassis has multiple slots. The IC cards are arranged in each slot such that one IC card is in a front slot location and the other IC card is in a rear slot location. One or more of the IC cards form a switching fabric over which the other IC cards in the chassis are connected and other network elements in the network may be connected. In some implementations the IC cards used to form the switching fabric, switching fabric cards, are located in the front slot locations. Other cards located in the front slot locations and connected to the switching fabric cards include, but are not limited to: application/service cards that provide application data processing specific to an application such as transaction processing, data base transactions, message based processing, as well as provide control plane and management plane signaling; IO connector cards that facilitate routing of IO data between rear slot cards and the switching fabric cards and storage cards that facilitate storage of IO data as appropriate; and cards that provide network connection to general internet, specific separate networks (for example SS7 or customer specific networks) using different interface (both cable types and protocols) or different networks or sections like a gateway or large database farm or processing farm access, or special purpose like a Geo stationary satellite or other long distance link. The front slot cards may have one or more ports for receiving/transmitting IO data. Some of the tear slot cards may also have one or more ports for receiving/transmitting IO data as an external connection on the rear slot card as opposed to internal connection via the front slot card. Having network layer devices in at least some of the rear slot cards, as well as the front slot cards, which includes the switching fabric cards, enables rear slot cards having the network layer devices to form a logical network layer with the front slot cards. Forming such a logical network layer enables, in some embodiments, IO data that arrives at the port of the tear slot card having the network layer card to be delivered to the switching fabric via the front slot card that the rear slot card is connected to without having processing performed by processors on the front slot card. In some embodiments the network layer device is configured to perform classification of IO data received externally at the port. Based on this classification the network layer device is capable of arranging the routing/forwarding of the IO data to a desired destination via the front slot card and switching fabric, as opposed to the front slot card having to process the IO data to determine where the IO data is to be routed/forwarded and then routing/forwarding the data as appropriate. In some embodiments this reduces processing at the front slot card and improves the delivery time of the IO data as less time is needed in processing by the IO data at the front slot card.

In accordance with some embodiments of the invention, the IO delivery within a system described herein can refer to network functions that include layer 2 switching, layer 3 routing, policy based forwarding, encapsulation/decapsulation, encryption/decryption or other such applicable network functions. FIG. 1 will now be used to describe an example of the different components of an IO delivery system within an apparatus that include specific network device components and specific IO device components. FIG. 1 will be described with reference to a particular example of an ACTA chassis and IC cards that may be mounted in the chassis, but this is for exemplary purposes and not intended to limit the scope of the invention.

In delivery of IO data within a conventional ATCA chassis, the backplane standards play an important role. The ATCA backplane provides point-to-point connections between the cards mounted in the chassis. The backplane does not use a data bus. The backplane definition is divided into three sections, namely ZONE1, ZONE2, and ZONE3. The connectors in ZONE1 provide redundant power and shelf management signals to the cards. The connectors in ZONE2 provide the connections to the Base Interface and Fabric Interface. In ATCA, the Fabric Interface interconnects all cards for application transactions like sending application messages between cards. The Base Interface interconnects all cards and is used for maintenance and control traffic. The Base Interface allows a separate network that is independent of the Fabric Interface so maintenance functions do not impact application performance and enables solving issue such as dealing with overload control when application messages cannot successfully be sent.

The ATCA Base Interface is specified in the PICMG3.0 standard. The Fabric Interface is specified in a number of PICMG3.X standards since ATCA supports Ethernet, RapidIO, Infiniband Fabric connections. While the standards may act as a guide for ACTA operation, they are not intended to limit the scope of the present invention or the operation of systems and devices consistent with the invention.

The connectors in ZONES are user defined and are usually used to connect a front slot card to a rear slot card, such as a Rear Transition Module (RTM) card.

In FIG. 1 the backplane includes both ZONE1 connectors 104 and ZONE2 connectors 105. ZONE3 connectors, which are illustrated as blocks 102, 108 and 111, specify the connection between the front slot card and the RTM. Signals occurring on ZONE1 connectors 104 pertain to power and system maintenance providing power to the front slot cards and to the rear slot cards via the front slot cards. Signals occurring on ZONE2 connectors 105 pertain to intra-shelf communications between the non-switching fabric front slot cards and switching fabric front slot cards 106. The switching fabric is the electrical connections that form the backplane and thereby implement traffic carrying functionality. The switching fabric card takes the signals from the backplane and converts them to packets and routes them along other switching fabric paths to get to the destination card. The fabric is the connection and the switch card directs to the correct physical path to get to the destination.

In some implementations a switching fabric may be implemented in a mesh interconnection between non-switching fabric front slot cards and as such no switching fabric cards are used to implement the switching fabric. In some implementations, which are not intended to limit the scope of the invention, ZONE2 connectors and the switching fabric front slot cards may include at least one of base 1 Gbits/s backplane interconnects and associated hardware devices, 10 Gbits/s backplane interconnects and associated hardware devices, and 40 G backplane interconnects and associated hardware devices. In some embodiments ZONE2 connectors and the switching fabric front slot cards may be consistent with the PICMIG standard.

ZONE 3 signals and Zone3 connectors 102, 108 and 111 are not defined by any ATCA standard and as a result the ZONE3 signals and connectors are vendor specific. The ZONE 3 connectors 102, 108 and 111 are unique in that they carry signals from the RTM cards 101, 107 or 110 to the front slot cards 103, 109 or 113 respectively. There are no cross-slot signals for ZONE 3 connectors on the backplane 113 because a rear slot RTM card is considered to be a part of the front slot card to which it is directly connected: Conversely, signals travelling on the ZONE1 connectors 104 and signals travelling on the ZONE2 connector 105 cross the slots in the backplane for slot interconnectivity and system wide maintenance control.

The rear slot RTM cards 101, 107 or 110 are connected to the front slot cards 103, 109 or 113, respectively, through the ZONE3 connectors 102, 108 and 111. The front slot cards 103, 109 or 113 are typically application/service cards with some amount of processing entities available. Examples of various roles and designs of the front slot cards within the ATCA system are explained in further detail below with reference to FIGS. 4A, 4B, 4C, 4D, 4E and 4F. FIG. 1 illustrates a lack of connectivity from the rear slot RTM cards 101, 107, or 110 to the switching fabric card 106 through the ZONE1 connections 104 or ZONE2 connections 105. The ATCA standards currently prohibit backplane signals directly connected between ZONE3 102, 108 or 111 connectors and either ZONE2 104 or ZONE3 105 connectors of other slots. Any connections to the switching fabric cards 106, or mesh switching fabric, from the rear slot RTM cards 101, 107 or 110 must be made through devices and interconnects on the respective front slot cards 103, 109 or 113. In conventional operation, without the logical network layer described herein, without a front cards 103, 109, 113 in place, there is no capability for IO delivery between the switching fabric cards 106 and the RTM cards 101, 107, 110.

Figure 2:
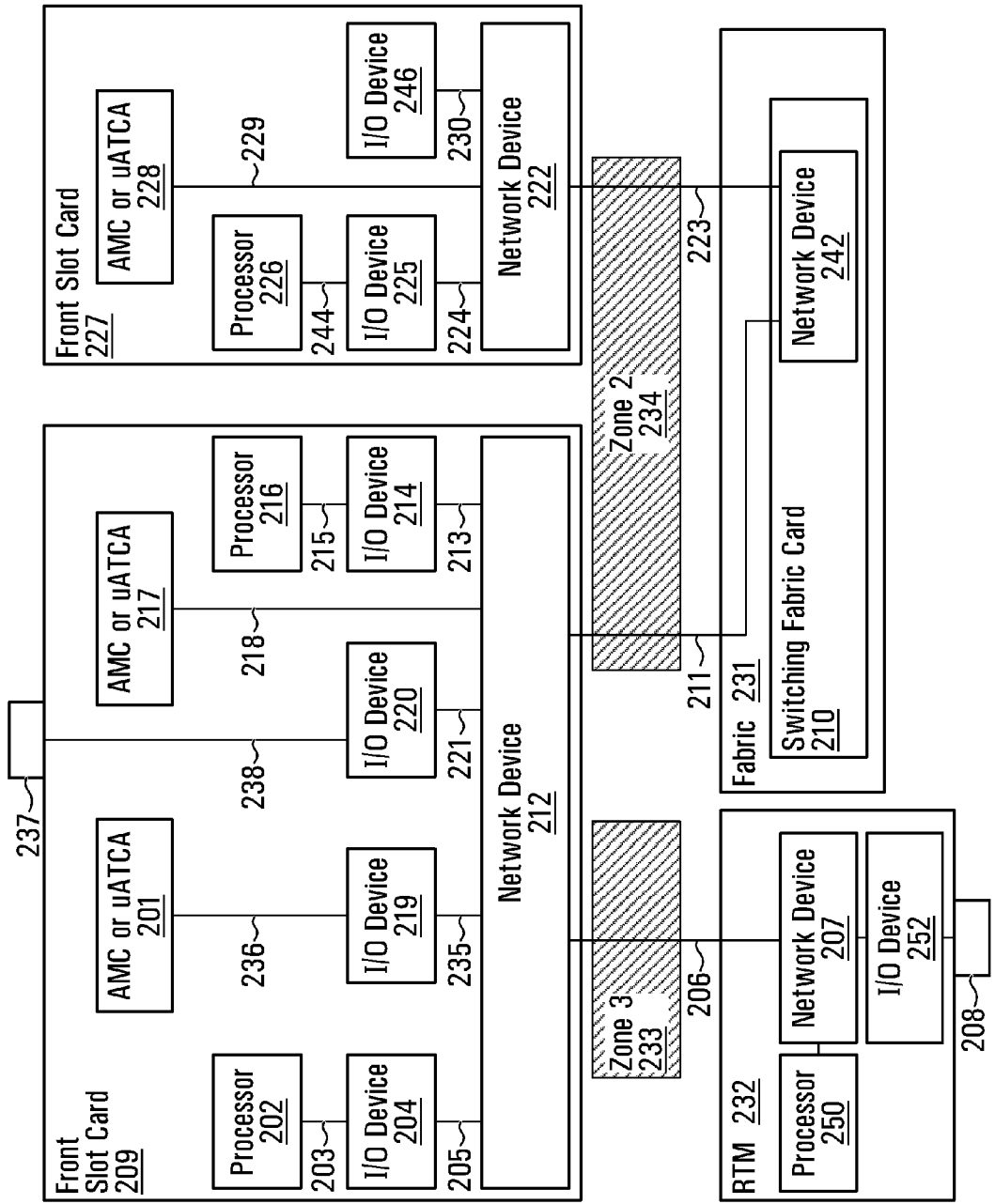
FIG. 2 is an exemplary schematic diagram of components and interconnects that are implemented in some embodiments of the invention.

FIG. 2 illustrates an example of the basic component types and interconnectivity methods to provide system wide interconnectivity from any port on any card to any other port on any other card whether that port is an external connection on a rear slot RTM card or internally connected processing entity on a front slot card.

A more detailed view of the connectivity of cards in an ATCA chassis will now be described with reference to FIG. 2. FIG. 2 illustrates a rear slot RTM card 232 coupled to a first front slot card 209 via a ZONE3 connector 233 on signal path 206. The first front slot card 209 is coupled to a switching fabric 231 via a ZONE2 connector 234 on signal path 211. In FIG. 2 at least a portion of the switching fabric 231 is embodied on switching fabric card 210. As discussed above, an alternative to the switching fabric 231 is a mesh interconnect between front slot cards. A second front slot card 227 is also coupled to switching fabric card 210 via ZONE2 connector 234 on signal path 223. While only two front slot cards are illustrated coupled to the switching fabric and only a single RTM card is connected to a single front slot card, it is to be understood that more than two front slot cards could be coupled to the switching fabric and more than a single front slot card could have a connected rear slot RTM card.

The RTM card 232 includes one or more external physical ports 208 for receiving IO data from outside the chassis. The RTM card 232 includes a network device 207. The one or more external physical port 208 is connected to the network device 207 via an IO device 252. In some embodiments the IO device is a line driver interface. Also connected to the network device 207 is a processor 250. In some embodiments the RTM card includes memory storage (not shown). The memory storage may be memory storage associated with the processor 250, or general purpose memory for purposes other than the processor 250. In some embodiments the memory storage may be one or more disk used as part of a storage area network (SAN). In some embodiments, the processor 250 may have onboard memory on a processor chip implementing the processor or utilize memory storage (not shown) elsewhere in the RTM card, or both.

The first front slot card 209 includes a network device 212. The second front slot card 227 includes a network device 222. The switching fabric card 210 includes a network device 242. The network device 212 on the first front slot card 209 connects to network device 207 on RTM card 232 using ZONE3 connector 233. The network device 212 on the first front slot card 209 connects to the network device 242 on the switching fabric card 210 using ZONE2 connector 234.

The combination of the interconnected network devices on the RTM card, front slot cards, and switching fabric card create a single logical network device layer in the ATCA system where any IO port on any network device can forward, steer or route IO data to any other port on any other card having a network device.

A processor device running multiple processor cores can be broken into multiple logical processor entities running separate services and applications on each logical processor. Each of these applications or services has security requirements to keep them separated from the other groups of services or applications executing on either a different logical processor on the same physical processor entity or a different logical processor on a different physical processor.

In some embodiments the network layer of the front slot cards may also contain ports connected to Advanced Mezzanine Cards (AMC). In some embodiments the network layer may also contain ports connected to micro ATCA (µATCA) cards. These ports maybe directly connected to an AMC or µATCA card using network layer protocol interfaces, or indirectly through an IO layer device for transfer of the IO from network layer protocols to some PCI or similar memory transfer technology. In some embodiments, the IO layer includes IO devices that loop back to and from the network layer devices for in-band processing of IO data. In-band processing is protocol related processing such as encryption or decryption that can be performed by devices other than the network device such that the processing can be offloaded from the network device that initially receives the IO data and a network device of a destination by doing the processing somewhere between the two network devices. In some embodiments the IO devices include processor offload functionality that is implemented in hardware devices rather than software executed in the processor entity itself.

Referring again to FIG. 2, first front slot card 209 includes IO devices and processing devices as described above. Connected to network device 212 are four IO devices 204, 219, 220 and 214 via signal paths 205, 235, 221 and 213 respectively. A first processor 202 is connected to the first IO device 204 via signal path 203. A first AMC or µATCA device 201 is connected to the second IO device 219 via signal path 236. A second AMC or µATCA device 217 is connected directly to network device 212. A second processor 216 is connected to the fourth IO device 214 via signal path 215. IO device 220 is connected to one or more external physical port 237 via link 238. On the second front slot card 227, two IO devices 225, 246 are connected to network device 222 via signal paths 224, 230, respectively. A first processor 226 is connected to the first IO device 225 via signal path 244. A first AMC or µATCA device 228 is connected directly to network device 222.

While FIG. 2 illustrates a particular number of IO devices, processors and other devices on the respective front slot cards it is to be understood that these are simply by way of example and front slot cards could have any number of IO device, processors and other devices so long they devices are supported with regard to power constraints, thermal operating constraints and size constraints.

In some implementations the switching fabric is one or more front cards configured to act as the switching fabric. In some implementations the switching fabric is a 40 Gb/s, 10 Gb/s, or 1 Gb/s star topology network using switching cards containing network devices. In some implementations the switching fabric is a 40 Gb/s, 10 Gb/s, or 1 Gb/s mesh interconnect eliminating the need for switching fabric cards, except where backwards compatibility with older 10 Gb/s or 1 Gb/s front cards may be preferable. In some implementations the switching fabric is compliant with Industrial Computer Manufacturers Group (PICMG) standards. For example, conventional ATCA specifications are defined or compliant, or both, by the PICMG 3.x series. PICMG 3.0 is the ATCA base specification and PICMG 3.1 specifies the use of Ethernet for Data Fabric communication.

It is to be understood that forming a logical single network layer by interconnecting network devices located on front slot and rear slot cards across the system, in particular cards that have IO receive and/or transmit capability, as described in the present application can be implemented regardless of the connectivity implemented for the switching fabric.

In FIG. 2, the network devices of the various front slot and rear slot cards make up the network layer consisting of ports that bring IO data into the system through external physical ports, and ports that bring IO data to and from internally connected processor entities using IO interface devices in the IO layer. The IO layer is used to transfer IO data from the network layer into the processing layer. The processing layer may, for example, include one or more of a processor, processor memory, processor offload devices and additional memory.

In some embodiments PCI-E switches are used to interconnect IO devices in the IO layer and processor entities together.

The methods of connecting the rear slot RTM card to the front slot card using the ZONE3 connector and signals that match ZONE2 signals are not limited to network layer device interconnectivity and may be used to implement interconnectivity of an IO layer device. In some implementations the external port connections are made directly into the IO layer using network interface connections.

In some embodiments, the network layer may be accomplished externally to the ATCA system using network specific equipment.

In some embodiments the network layer devices and IO layer devices are configured to support IEEE communication standards such as IEEE 802.1p, 802.1bb 802.1Qau, and 802.1az. With the use of above mentioned IEEE standards, the network layer devices may meet IO data requirements for application/service cards to provide low latency inter-service traffic as part of application clustering, high speed storage traffic requirements for file system support, and external IO data traffic requirements from the external network ports. In some embodiments the network layer may meet IO data requirements for application/service cards to provide low latency inter-service traffic via Remote Direct Memory Access (RDMA).

Some embodiments of the invention support the implementation of networking methods of virtual local area networks (VLAN), virtual routing (VR), virtual routing and forwarding (VRF), traffic management and policy based filtering and forwarding in the networking layer devices to meet the security requirements of application segregation across the different logical processor entities within the ATCA system.

Within an ATCA chassis, the ratio of IO ports to processor entities varies from deployment scenario to deployment scenario. In some deployments, a large fan-out of low speed ports is connected into the system having a smaller number of processor entities. In other deployments, there is a small number of high speed ports connected into the system having a much large number of processor entities. There are also those deployments having a number of ports and a number of processor entities that lie somewhere between the two extremes of a large number of lower speed ports limited by connectivity and a small number of high speed ports limited by the processing required.

Some embodiments of the invention include a manner for separating IO personality of the system from the processor personality, or in other words the number of IO ports is decoupled from the number of processor entities used in the system. For example, when a rear slot RTM card is to be replaced, the processor on the front slot card goes operationally out of service because the IO data signal from the rear slot RTM card has been lost. However, in some implementations of the invention, IO traffic could still be maintained through another rear slot RTM card by changing the external route by which the IO data is provided to the system or by sharing IO data input between rear slot cards and front slot cards in different slots. As a result traffic loss may be reduced.

Figure 3:
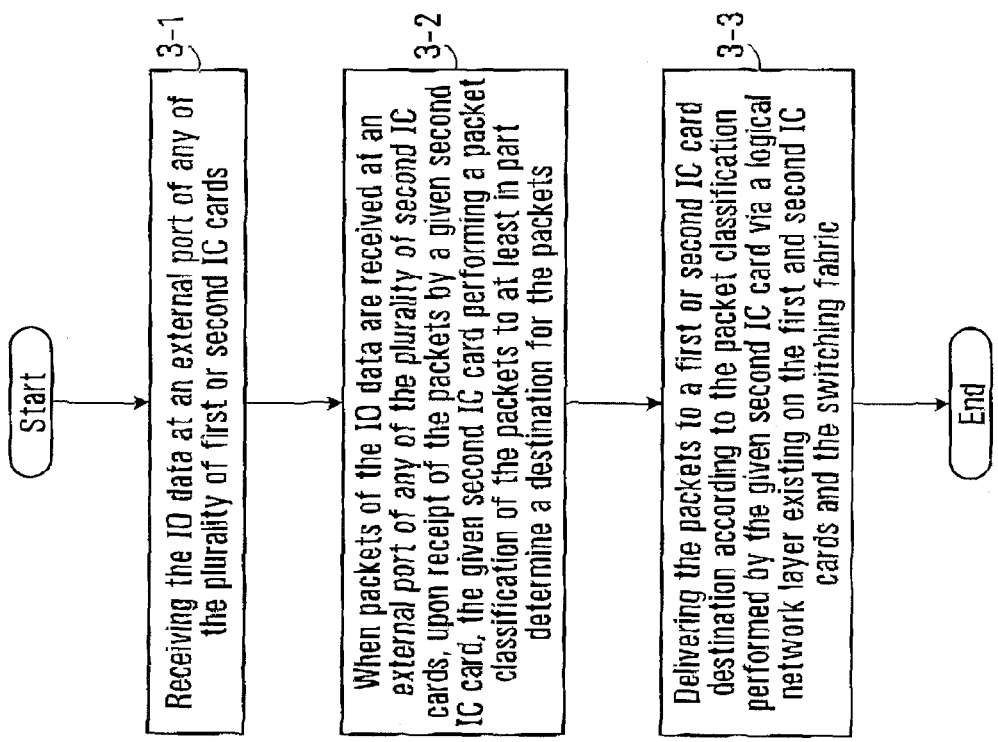
FIG. 3 is a flow chart illustrating a method according to an embodiment of the invention.

A method for routing IO data in a telecommunication system will now be described with reference to the flow chart illustrated in FIG. 3. The system includes at least one network node comprising a plurality of first integrated circuit (IC) cards, a plurality of second IC cards and a switching fabric. Each second IC card is connected to a corresponding first IC card in a respective slot of the network node. A first step 3-1 of the method involves receiving the IO data at an external port of any of the plurality of first or second IC cards. When packets of the IO data are received at an external port of any of the plurality of second IC cards, a second step involves, upon receipt of the packets by a given second IC card, the given second IC card performing a packet classification of the packets to at least in part determine a destination for the packets. A third step of the method involves delivering the packets to a first or second IC card destination according to the packet classification performed by the given second IC card via a logical network layer existing on the first and second IC cards and the switching fabric.

As mentioned above, the network layer consists of several networking devices connected together logically functioning as a single entity. FIGS. 4A, 43, 4C, 4D, 4E and 4F illustrate different system card configurations to meet the different amounts of IO port and processor entity capacities.

Figure 4A:
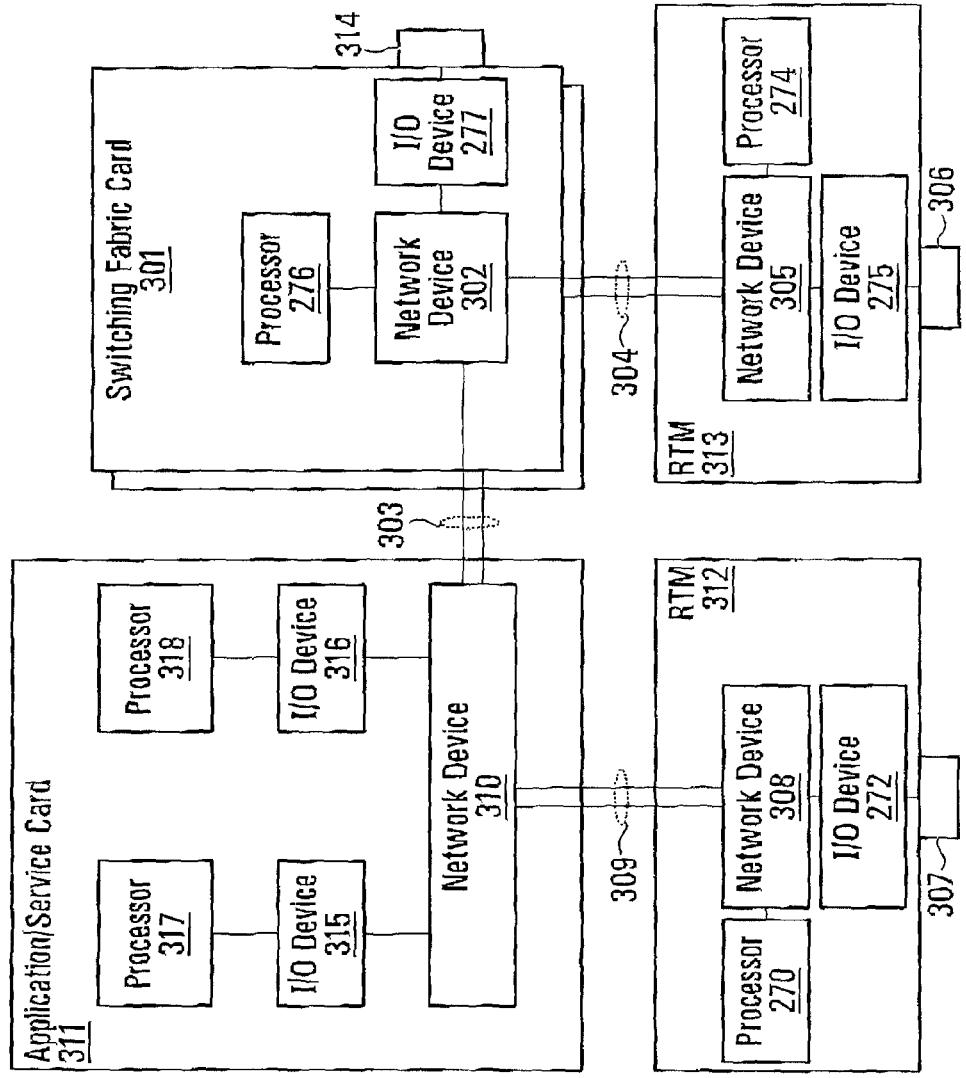
FIGS. 4A, 4B, 4C, 4D, 4E and 4F are exemplary block diagrams showing the location and arrangement of components to provide different IO and processing embodiments of the invention.

With regard to the description of FIGS. 4A, 4B, 4C, 4D, 4E and 4F below, reference is made again to "slots" being occupied by "IC cards". A slot includes a location for a front card and a rear card, or more generally a first card and a second card. In FIGS. 4A and 43, the rear cards are RTM cards and front cards are illustrated to be an application/service card (FIG. 4A) and an IO connector card (FIG. 43). In some implementations, such as illustrated in FIG. 40, a slot may include two application/service cards in the front and rear slot card locations respectively. FIGS. 4A, 4B, 4C, 4D, 4E and 4F are examples with a limited number of front and rear slot location cards illustrated. It is to be understood that configurations different than the examples shown in the figures would be within the scope of the invention. FIGS. 4A, 43, 4C, 4D, 4E and 4F are various examples of slot arrangements that could be supported by embodiments of the invention.

In FIG. 4A, a first slot is illustrated to include an application/service card 311 in a front slot location and an RTM card 312 in a rear slot location. The RTM card 312 includes a network device 308, a processor 270, one or more external physical port 307 for receiving/transmitting IO data and an IO device 272 located between the one or more external physical port 307 and the network device 308. The IO device 272 may for example be a line driver interface. The RTM card 312 may also include memory storage (not shown). The application/service card 311 includes a network device 310. The network device 308 of the RTM card 312 is coupled to the network device 310 of the application/service card 311 via link 309. The application/service card 311 also includes a first IO device 315 connected to the network device 310 and a first processor 317 connected to the first IO device 315 and a second IO device 316 connected to the network device 310 and a second processor 318 connected to the second IO device 316. In some embodiment transfer of data between the network device 310 and the IO devices 315,316 via the IO layer and onto the respective processors via the processing layer may be handled in a manner consistent with the description above with reference to FIGS. 1 and 2.

It is to be understood that the use of two IO devices and two processors is exemplary and not intended to limit the scope of the invention as more or less than two of each component could be included on an application/service card.

In some embodiments the network layer devices 308,305 of the RTM cards 312,313 are configured to perform classification of IO data received at the external ports 307,306. Based on this classification the network layer devices are capable of arranging the routing/forwarding of the IO data to a desired destination via a front slot card or the switching fabric, or both, as opposed to the front slot card having to process the IO data to determine where the IO data is to be routed/forwarded and then routing/forwarding the data as appropriate. In some embodiments this reduces processing at the front slot card and improves the delivery time of the IO data as less time is needed in processing by the IO data at the front slot card.

The switching fabric is illustrated as two switching fabric cards 301 in the front slot position of two respective switching fabric slots and the connections to the other front and rear slot cards. A network device 302 is included on each switching fabric card 301. The switching fabric cards also include a processor 276. The network device 302 in the exemplary illustration of FIG. 4A has an external physical port 314 for receiving/transmitting IO data and an IO device 277 located between the one or more external physical port 314 and the network device 302. The IO device 277 may for example be a line driver interface. The switching fabric card may also include memory storage (not shown). The network device 310 of the application/service card 311 is coupled to the network device 302 of the switching fabric card 301 via link 303.

The network layer in this slot configuration consists of the two network devices, 308 and 310, of which the network device 310 of the application/service card 311 is used to interconnect the network device 308 of the RTM card 312 using ZONE3 connector signals to the network device 302 of the switching fabric card 301. The network device 310 on the application/service card 311 also provides interconnectivity of the first and second processors 317,318 to the network layer through the IO layer via first and second IO devices 315,316.

A second RTM card 313, having a network device 305, a processor 274, one or more external physical port 306 for receiving/transmitting IO data and an IO device 275 located between the one or more external physical port 306 and the network device 305 is shown in FIG. 4A occupying a rear slot position of one of the two switching fabric slots. The network device 305 of the second RTM card 313 is coupled to the network device 302 of the switching fabric card 301. The second RTM card 313 may extend the number of IO ports in the system by interconnecting the network device 305 on the second RTM card 313 through ZONE2 signals to the network device 302 on the switching fabric card 301.

The ability to route IO data over the single logical network layer via the ZONE3 and ZONE2 connectors provides flexibility to create a different set of external physical IO port connections into the system apart from the personality of the front slot card design or switching fabric design.

FIG. 4A illustrates an example of how the network device on the RTM card connecting to the network device on the application/service card allows IO ports on the RTM card connectivity to any other card in the system without the use of processor entities on the application/service card.

Figure 4B:
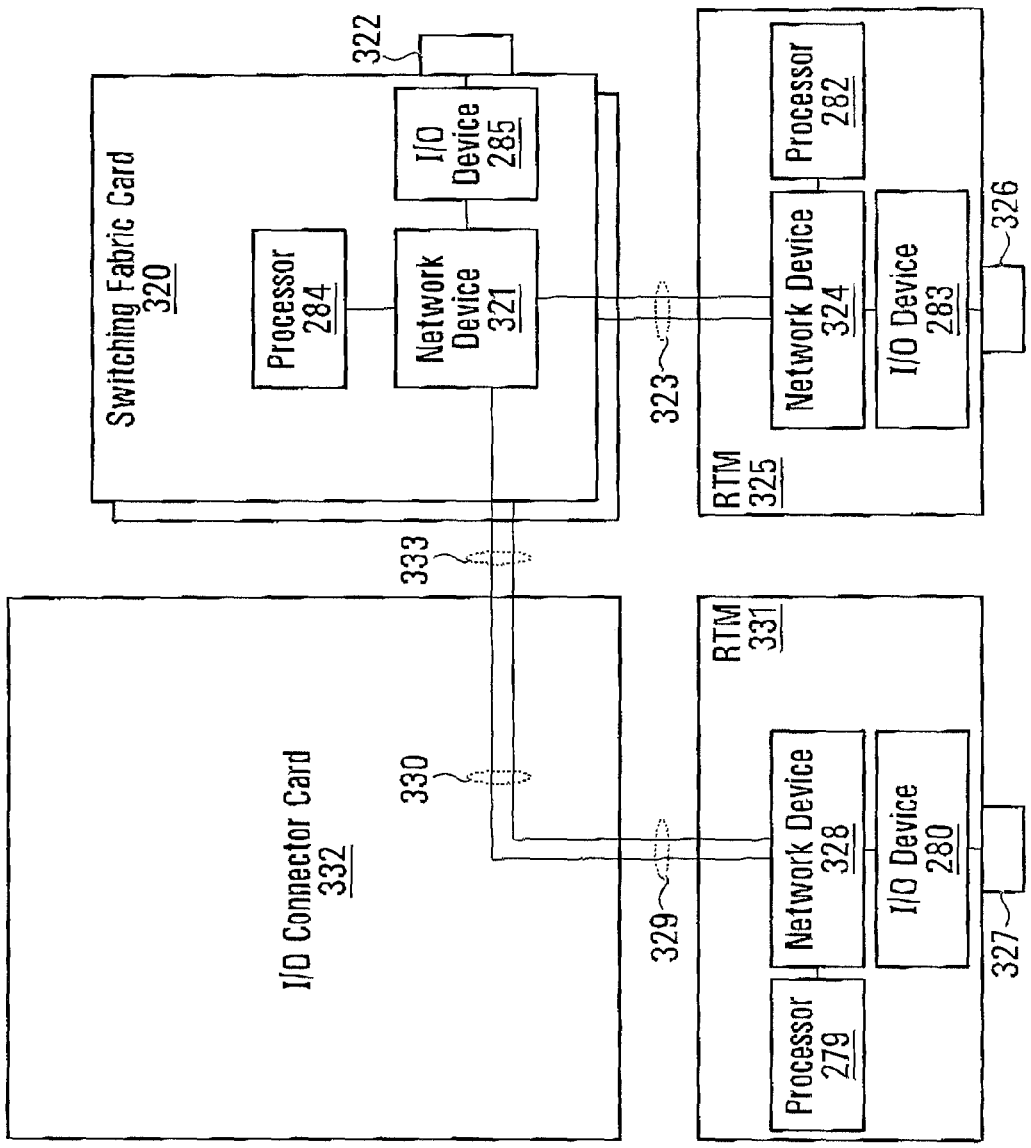

FIG. 4B illustrates a similar multi-slot arrangement to FIG. 4A in which a first slot includes a RTM card 331 in a rear slot location having a network device 328, a processor 279, one or more external physical port 327 for receiving and/or transmitting IO data and an IO device 280 located between the one or more external physical port 327 and the network device 328 and an IO connection card 332 in a front slot location. The IO device 280 may for example be a line driver interface. The RTM may also include memory storage (not shown).

The switching fabric is illustrated to be two switching fabric cards 320 in front slot locations of two respective slots and the various connections to the various front and rear slot cards, each switching fabric card 320 having a network device 321, a processor 284, one or more external physical port 322 for receiving and/or transmitting IO data and an IO device 285 located between the one or more external physical port 322 and the network device 321. The IO device 285 may for example be a line driver interface. The switching fabric cards may also include memory storage (not shown).

A second RTM card 325 in a rear slot location of one of the switching fabric slots has a network device 324, a processor 282, one or more external physical port 326 for receiving and/or transmitting IO data and an IO device 283 located between the one or more external physical port 326 and the network device 324.

As depicted in FIG. 43, keeping the ZONE3 signals the same as the ZONE2 signals provides the system with the ability to use a simplified IO connector card, for example a card that had minimal functionality beyond routing IO data from the RTM to the switching fabric, in the front slot location to carry interconnect signals from the network device 328 of RTM card 331, through the IO connector card 332 via a combination of the ZONE3 and ZONE 2 connectors into the network devices 321 of the respective switching fabric cards 320 via paths 329, 330, 333. The IO connector card 332 may be used in implementations where the IO port capacity is an issue and the use of an application/service card, such as that used in FIG. 4A, is not required for processing capacity. For example, in some embodiments two or more RTM cards could be connected, either logically or physically, to the IC connector card, enabling larger IO port capacity. In some embodiments, the RTM card may take on processing that may have otherwise been performed by a front slot application/service card and as such an application/service card is not required for processing capacity. In such a slot configuration, the IO connector card 332 may utilize some active components to provide the necessary power and card management signals to the RTM card 328.

As with FIG. 4A, FIG. 3B also depicts how a second RTM card can be used in the rear slot location of at least one of the switching fabric slots to provide additional IO port capacity to the system by interconnecting the network device 324 on the second RTM card 325 through ZONE3 connections to the network device 321 on one of the switching fabric cards 320.

Figure 4C:
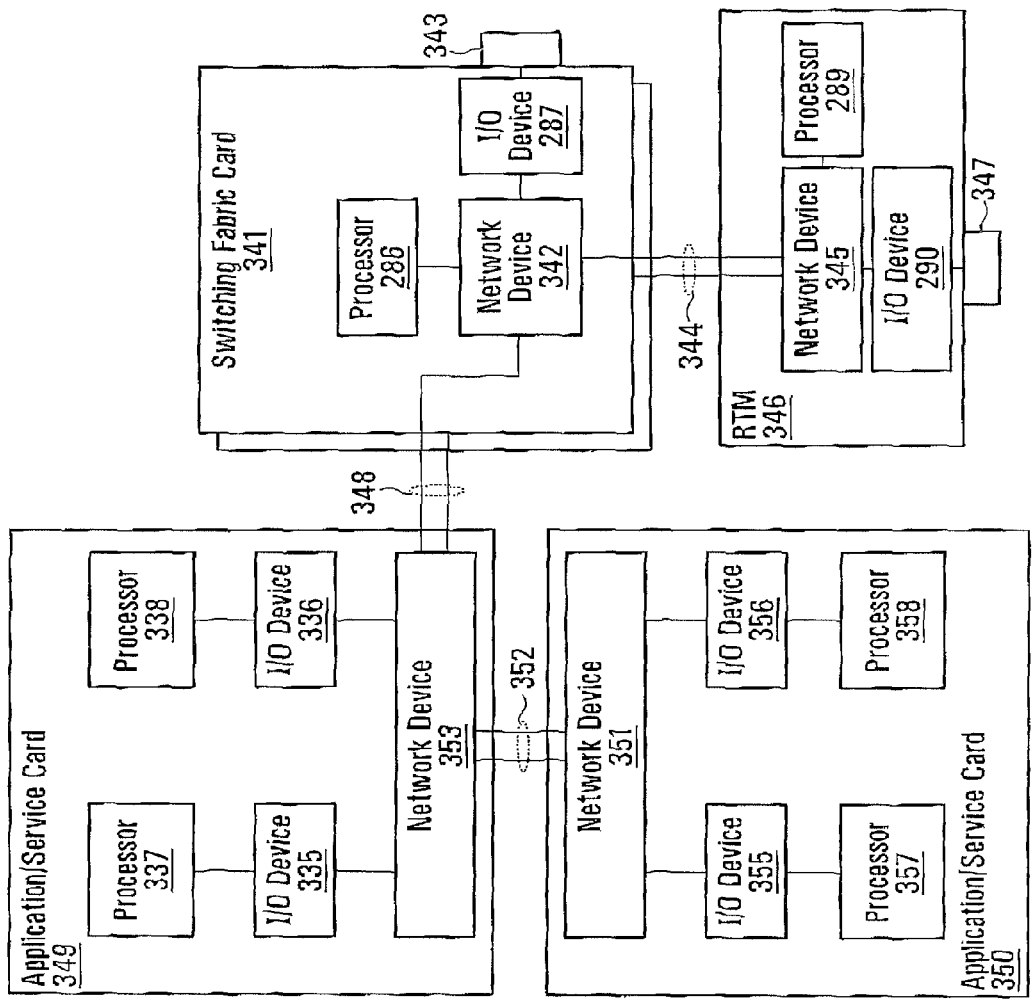

FIG. 4C illustrates a configuration in which a slot includes two application/service cards, one in the front slot location and one in the back slot location. In such a scenario external IO ports may be connected to the front slot card. External ports are not illustrated in FIG. 4C, however the application/service cards may have external physical ports connected in a manner similar to FIGS. 2 and 5. In some embodiments there is less fanout than is available if external ports are connected to both an RTM card and a front slot card. However, due to the evolution towards large bandwidth ports this may not be problematic. Current ATCA standards regarding power and size restrictions of the rear slot card, the amount of processing capacity available on the rear slot card is somewhat limited. Proposed changes to the ATCA standards may change those restrictions and permit similar or identical processor capacity on both the front slot card and the rear slot card.

FIG. 4C illustrates a similar multi-slot arrangement to FIGS. 4A and 4B in which a first slot includes first and second application/service cards 349 and 350, each having a network device 353 and 351, respectively. Each application/service card 349,350 include first and second IO devices 335,336, 355,356 connected to the network device 353,351 of the respective application/service cards 349,350 and first and second processors 337,338,357,358 connected to the first and second IO devices 335,336,355,356.

The switching fabric is illustrated to be implemented as two switching fabric cards 341 in front slot locations of two respective slots and the various connections between the front and rear slot cards, each switching fabric card 341 having a network device 342, a processor 286, one or more external physical port 343 for receiving and/or transmitting IO data and an IO device 287 located between the one or more external physical port 343 and the network device 342. The IO device 287 may for example be a line driver interface. The switching fabric cards may also include memory storage (not shown).

FIG. 4C also illustrates an RTM card 346 used a rear slot location of the switching fabric slot to provide additional IO port capacity to the system by interconnecting a network device 345 on the RTM card 346 through ZONE3 connections 344 to the network device 342 on the switching fabric card 341. The RTM card 346 in the example of FIG. 4C also includes a processor 289, one or more external physical port 347 for receiving and/or transmitting IO data and an IO device 290 located between the one or more external physical port 347 and the network device 345. The IO device 290 may for example be a line driver interface. The switching fabric cards may also include memory storage (not shown).

As depicted in FIG. 4C, the network device 353 of the front application/service card 349 is connected to the switching fabric card using 341 a conventional ZONE2 connector. A ZONE3 connector is used to interconnect the network device 351 of the rear application/service card 350 to the network layer using the network device 353 on the front card 349. The combination of the network devices 353,351 on the two application/service cards 349,350, together with the network device on the switching fabric Card 341 and the network device 345 on the RTM card 346 creates a single logical network layer device as with previous illustrations of interconnected network devices. The network devices 353,351 on the front and rear cards are also used to interconnect the processor entities 357,358 on the rear card 350 through the set of IO layer devices 355,356. The IO layer devices 335,336, 355,356 on both cards 349,350 are used to take IO data from and to the network layer and transfer them to and from processor memory using some form of memory transfer technology.

Figure 4D:
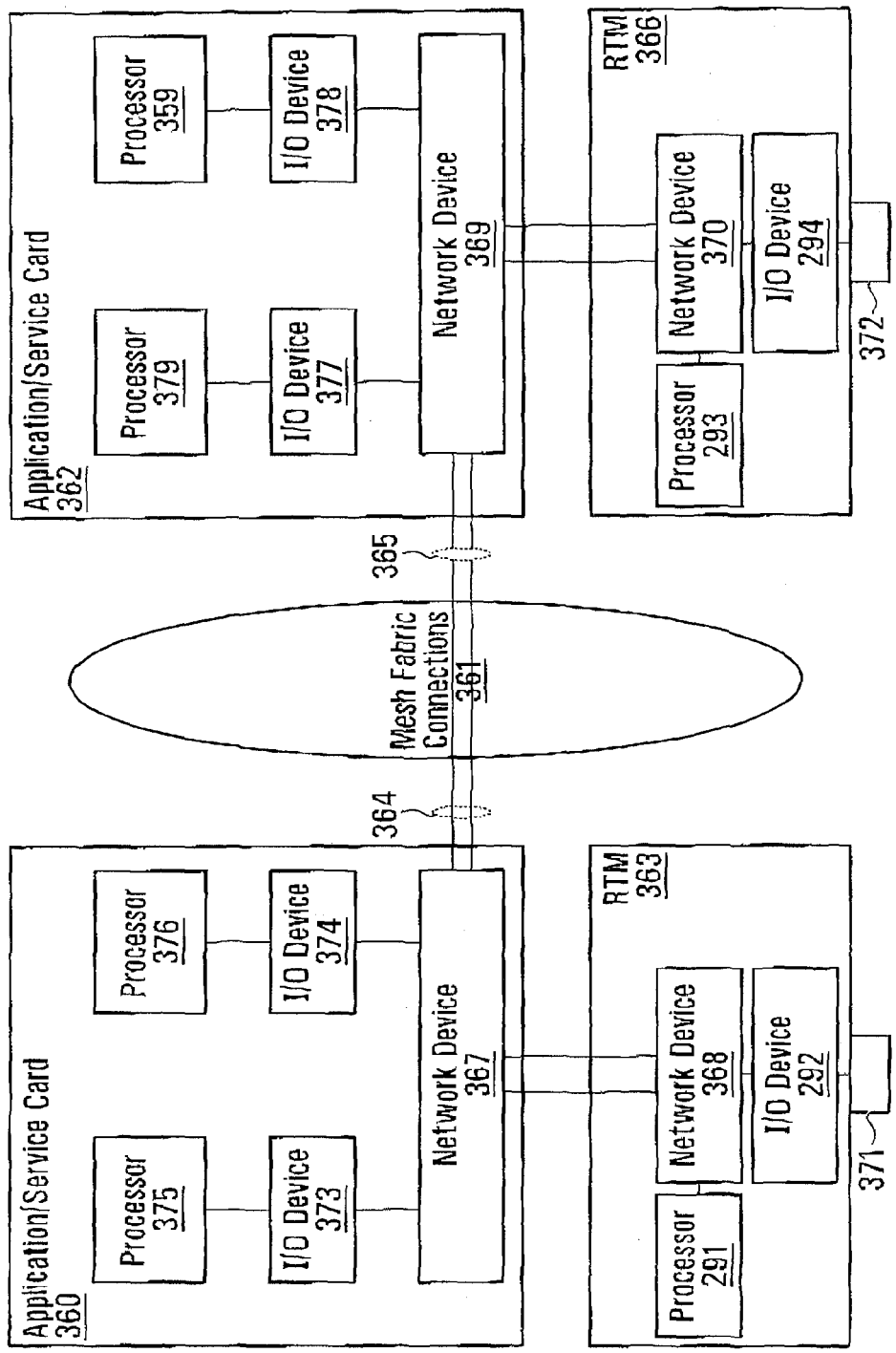

FIG. 4D illustrates an implementation of a mesh based fabric design. In some embodiments a switching fabric consists of a mesh of interconnects on the backplane for interconnecting all the slots within the ATCA system. As the slots are interconnected, no fabric switching cards are used other than possibly for providing backwards compatibility with older card types.

In FIG. 4D a first slot is illustrated to include an application/service card 360 in a front slot position and a first RTM card 365 in a rear slot position. The first RTM card 365 includes a network device 368, a processor 291, one or more external physical port 371 for receiving/transmitting IO data and an IO device 292 located between the one or more external physical port 371 and the network device 368. The IO device 292 may for example be a line driver interface. The switching fabric cards may also include memory storage (not shown). The application/service card 360 includes a network device 370. The network device 368 of the RTM card 365 is coupled to the network device 370 of the application/service card 360 via link 363. The application/service card 360 also includes a first IO device 373 connected to the network device 370 and a first processor 375 connected to the first IO device 373 and a second IO device 374 connected to the network device 370 and a second processor 376 connected to the second IO device 374. It is to be understood that the use of two IO devices and two processors is exemplary and not intended to limit the scope of the invention as more or less than two of each component could be included on an application/service card.

A second slot has a similar arrange to the first slot of an application/service card 362 having a network device 369 and two IO devices 377,378 and two processing devices 379,359 in a front slot location and a second RTM card 375 having a network device 378, a processor 293, at least one or more external physical port 372 and an IO device 294 located between the one or more external physical port 372 and the network device 378 in a rear slot location. The IO device 294 may for example be a line driver interface. The switching fabric cards may also include memory storage (not shown).

In FIG. 4D, the network device 370 of application/service card 360 interconnects with the network device 369 of application/service card 362 using a ZONE2 mesh interconnect connector. The network devices 370,369 on the application/service cards 360,362 also connect to the network devices on the RTM cards 365,375 using a ZONE3 connector. The ZONE3 connectors support a same signal format as the signals used to over the ZONE2 connector to connect to the mesh fabric interconnects. The network devices 368,370 on the RTM cards 365,375 are used to provide different external port personalities to the system without impacting the front card design. The network devices 370,369 on the application/service cards 360,362 are also used to interconnect the processor entities 375,376,379,359 to the system network layer using IO layer devices 373,374,377,378. The IO layer devices 373, 374,377,378 takes IO data to and from the network layer devices 364,362 into the memory of the processor entities 375,376,379,359 using some form of memory transfer technology.

Figure 4E:
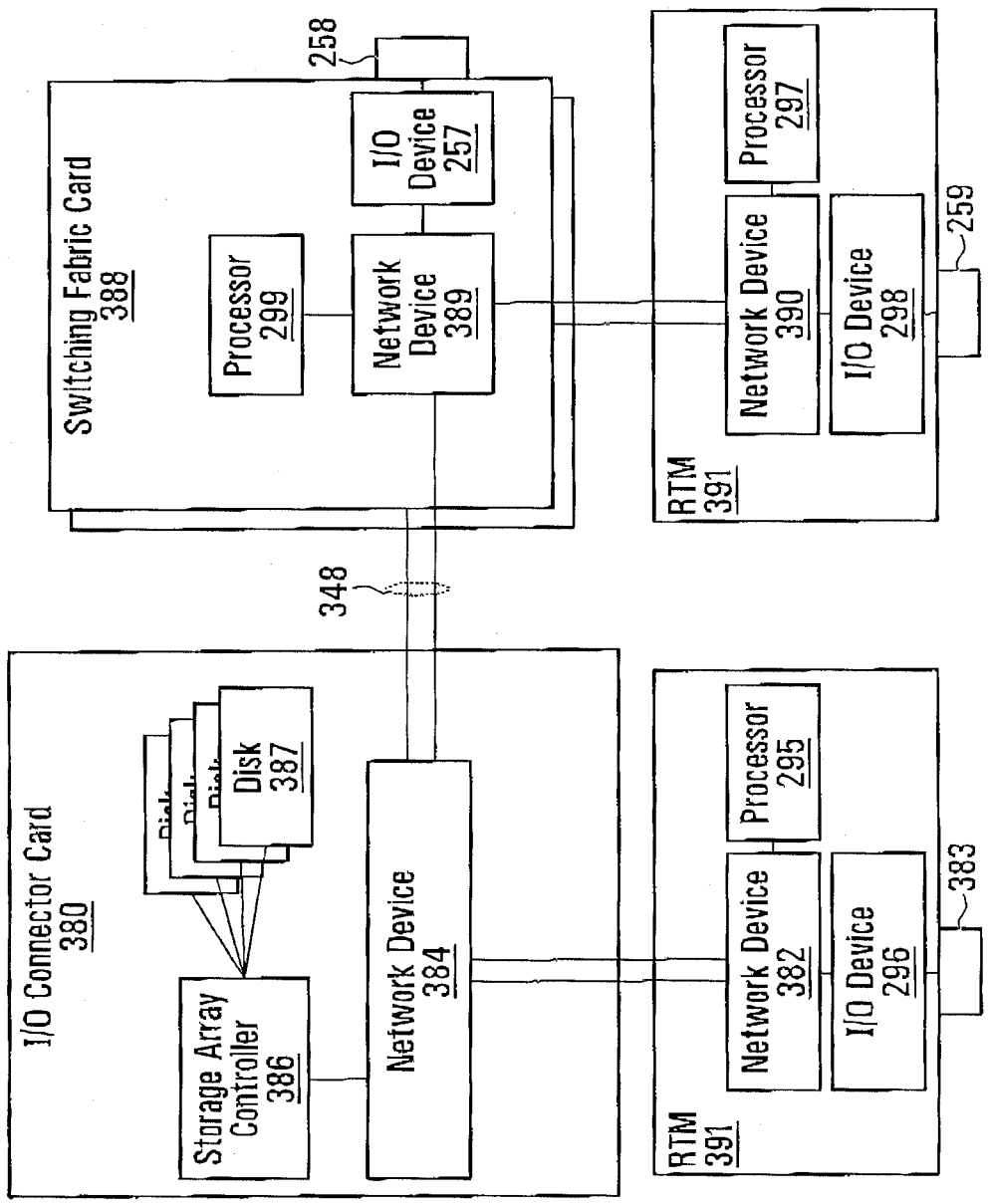

FIG. 4E illustrates a configuration similar to FIG. 4A except that the application/service card 311 of FIG. 4A has been replaced with a card configured for data storage in FIG. 4E.

In FIG. 4E a first slot is illustrated to include a data storage card 380 in a front slot position and a first RIM card 381 in a rear slot position. The RIM card 381 includes a network device 382, a processor 295, one or more external physical port 383 for receiving/transmitting IO data and an IO device 296 located between the one or more external physical port 383 and the network device 382. The IO device 296 may for example be a line driver interface. The RTM card may also include memory storage (not shown). In some embodiments, the memory storage on the RTM card may be part of a SAN.

The data storage card 380 includes a network device 384. The network device 382 of the RTM card 381 is coupled to the network device 384 of the data storage card 380 via link 385. The data storage card 380 also includes a storage array controller 386 connected to the network device 384 and four disks 387 connected to the storage array controller 386. The disks 387 may be part of a SAN. It is to be understood the four disks is merely used by way of example and the number of disks could be more than four or less than four.

Some additional slots in the system may have a switching fabric with a similar arrangement to the switching fabric slots of FIGS. 4A and 4B.

In FIG. 4E the network device 384 of the data storage card 380 is connected to a network device 389 on switching fabric card 388 using a conventional ZONE2 connector. ZONE3 connector is used to interconnect the network device 382 of the RTM card 381 to the network layer using the network device 384 on the data storage card 380. The combination of the network devices 384,382 on the data storage card 380 and the RTM card 381, together with the network device 389 on the switching fabric card 388 and a network device 390 on a second RTM card 391 creates a single logical network layer device as with previous illustrations of interconnected network devices.

The switching fabric cards 388 are also illustrated to include a processor 299, one or more external physical port 258 for receiving/transmitting IO data and an IO device 257 located between the one or more external physical port 258 and the network device 389. The second RTM card 391 is also illustrated to include a processor 297, one or more external physical port 259 for receiving/transmitting IO data and an IO device 298 located between the one or more external physical port 259 and the network device 390. The IO devices 257,298 may for example be line driver interfaces. The switching fabric and second RTM cards may also include memory storage (not shown).

The storage array controller 386 on data storage card 380 is used to take IO data from and to the network layer and transfer the IO data to and from at least one of the disks 397.

Figure 4F:
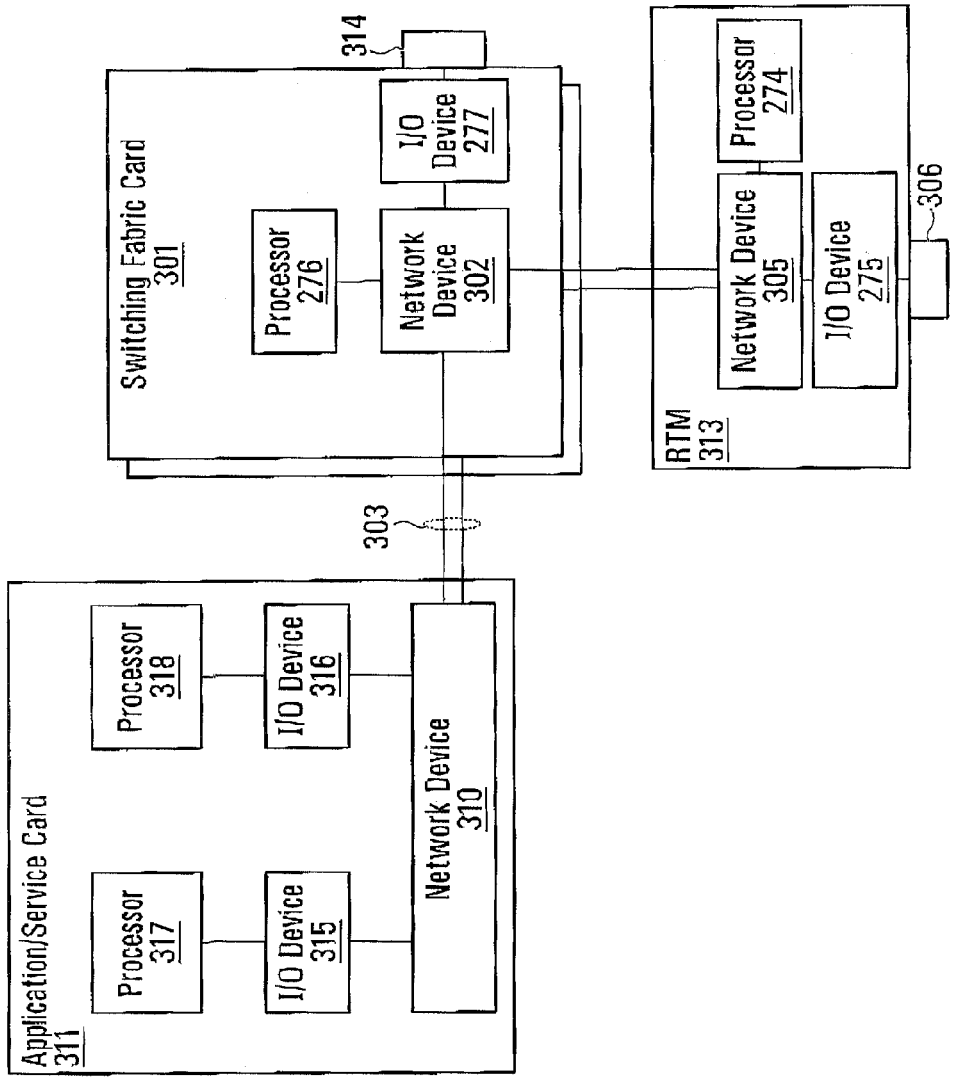

FIG. 4F is a further configuration on which embodiments of the invention may be implemented. FIG. 4F is substantially the same as FIG. 4A without an RIM card in a rear slot location behind the application/service card. Such a configuration may be used for control plane and management plane signaling.

In some embodiments of FIGS. 4A to 4F, the processors on the RTM cards, switching fabric cards and/or application/service cards may have onboard memory on a processor chip implementing the processor or utilize memory storage (not shown) elsewhere in the RTM card, or both.

It is to be understood that FIGS. 4A to 4F are examples and not intended to limit the invention. The number of processors, memory storage, IO devices, number of front slot location cards and rear location cards in a particular implementation may vary from those illustrated and still be within the scope of the invention. In some embodiments various combinations of the described cards could be included in a particular system.

Figure 5:
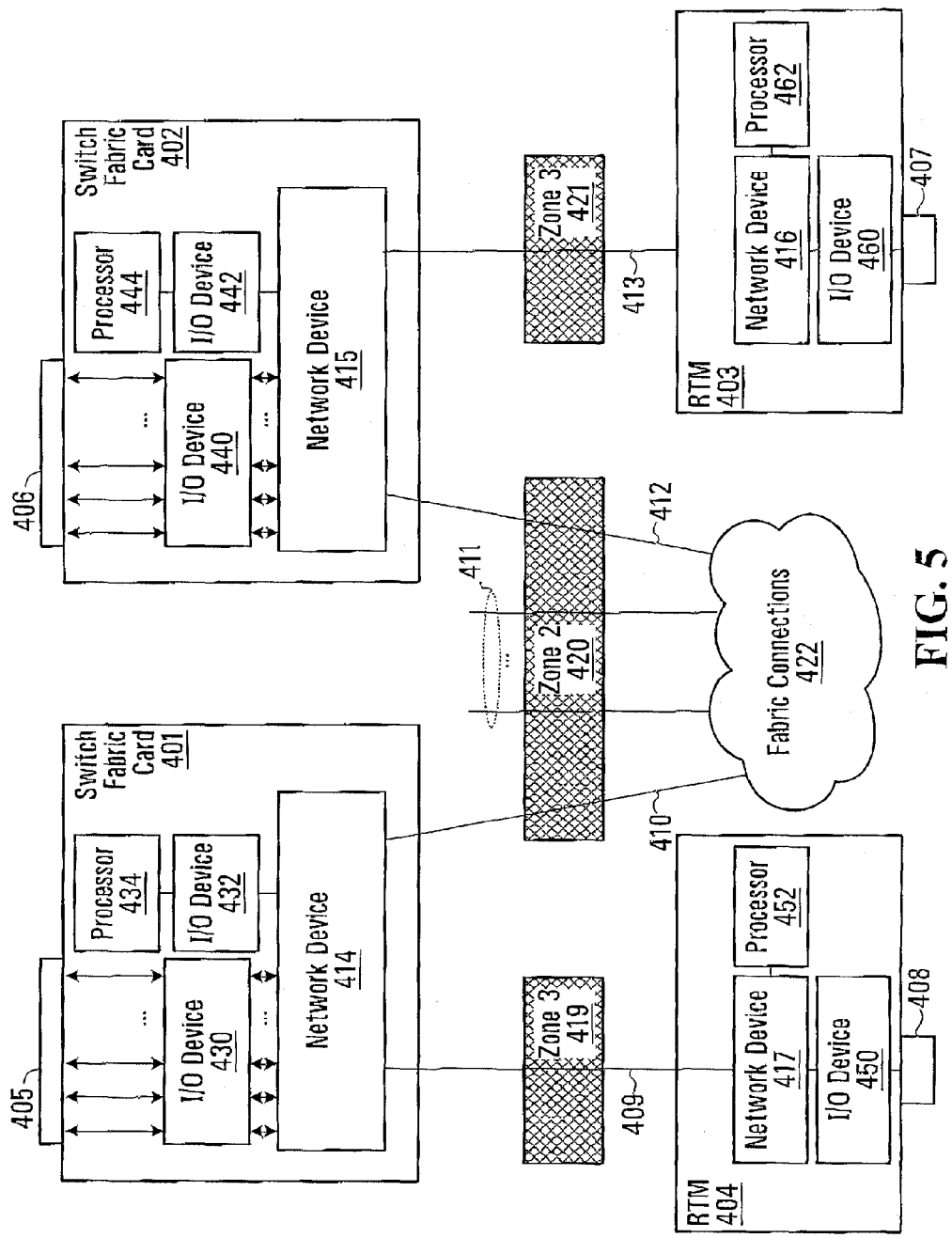
FIG. 5 is an exemplary schematic diagram of components and interconnects that are implemented in some embodiments of the invention.

FIG. 5 illustrates an example of the flexibility of external IO connectivity into an ATCA system in accordance with an embodiment of the invention.

In FIG. 5, a first slot is illustrated to include an application/service card 401 in a front slot location and a first RTM card 404 in a rear slot location. The first RTM card 404 includes a network device 417, a processor 452, one or more external physical IO port 408 for receiving/transmitting IO data and an IO device 450 located between the one or more external physical port 408 and the network device 417. The first RTM card 404 may also contain memory storage (not shown). The application/service card 401 includes a network device 414, a first IO device 432, a processor 434 connected to the first IO device 432, one or more external physical IO port 405 for receiving/transmitting IO data and a second IO device 430 located between the one or more external physical IO port 405 and the network device 414. The network device 417 of the first RTM card 404 is coupled to the network device 414 of the application/service card 401 via link 409 over ZONE3 connector 419.

A second slot is illustrated to include a switching fabric card 402 in a front slot location and a second RTM card 403 in a rear slot location. The second RTM card 403 includes a network device 416, a processor 462, one or more external physical IO port 407 for receiving/transmitting IO data and an IO device 460 located between the one or more external physical port 407 and the network device 416. The second RTM card 403 may also contain memory storage (not shown). The switching fabric card 402 includes a network device 415, a first IO device 442, a processor 444 connected to the first IO device 442, one or more external physical IO port 406 for receiving/transmitting IO data and a second IO device 440 located between the one or more external physical IO port 406 and the network device 415. The network device 416 of the second RTM card 403 is coupled to the network device 415 of the switching fabric card 402 via link 413 over ZONE3 connector 421.

The network device 414 of the application/service card 401 is connected to a switching fabric 422 via link 410 over ZONE2 connector 420. The network device 415 of the switching fabric card 402 is connected to the switching fabric 422 via link 412 over ZONE2 connector 420. Additional connections to other slots in the chassis may occur over links generally indicated at 411.

Since the interconnected network layer devices 417,414, 415,416 are connected to the switching fabric 422 to form a single logical network layer, any port on any card in FIG. 4, or card not shown, but included in the chassis, is capable of switching, routing or forwarding IO to any other port on any other card. Card designs with different external physical IO port configurations can meet the deployment requirements without the need for special deployment specific control plane or management plane software. In some embodiments, a single global slot and port designation nomenclature in the management system's user interface and programmatic control plane interface can be used to specify the external IO ports.

In FIG. 5, the one or more external physical IO port 406 on the switching fabric card 402 is connected to the network layer device 415 of the switching fabric card 402 directly. The one or more external physical IO port 406 provides connectivity to all other cards in the system using the network layer. The switching fabric card slots also provide ZONE3 connections to an RTM card, for example second RTM card 403. In FIG. 5, the one or more external physical IO port 407 on the second RTM card 403 of the switching fabric card slot are connected to the network layer device 416 of the second RTM card 403. This network device interconnects with the rest of the network layer using ZONE3 connector signals into the network layer device 415 of the switching fabric card 402.

The one or more external physical IO ports of the first and second RTM cards 404,403 provide rear slot physical port access to the system for those deployment scenarios that include rear slot connections. The one or more external physical IO ports on the switching fabric card 402 are front slot access ports for those deployment scenarios that include front slot connections. In both cases, external physical IO ports connected to fabric switching slots provide connections to all cards in the system using the network layer.

For some deployment scenarios, switching fabric card based IO connections are preferred to other external IO port connections on non-switching fabric slots for at least the ability to forward IO from the external port of the switching fabric card to an application/service card and back again using a single switching fabric interconnect.

In a case where the IO data enters an external physical port on a rear card or an external physical port on a front card of a non-switching fabric based card slot, the IO data may be forwarded through to an application/service card on another slot through the network layer device of the fabric switching card and then back again to the same IO port, consuming two of the switching fabric interconnect links in the switching fabric.

In some embodiments, an advantage to the non-fabric RTM port connections is the ability to support many external port IO connections from the increased faceplate real estate of more slots.

In some embodiments of FIG. 5, the processors on the RTM cards, switching fabric cards and/or application/service cards may have onboard memory on a processor chip implementing the processor or utilize memory storage (not shown) elsewhere in the RTM card, or both.

While FIG. 5, like FIGS. 4A to 4F refer specifically to RTM cards in the real slot location and switching fabric cards and application/service cards in the front slot location, more generally, the cards could be referred to as front cards and rear cards, or first cards and second cards.

Figure 6:
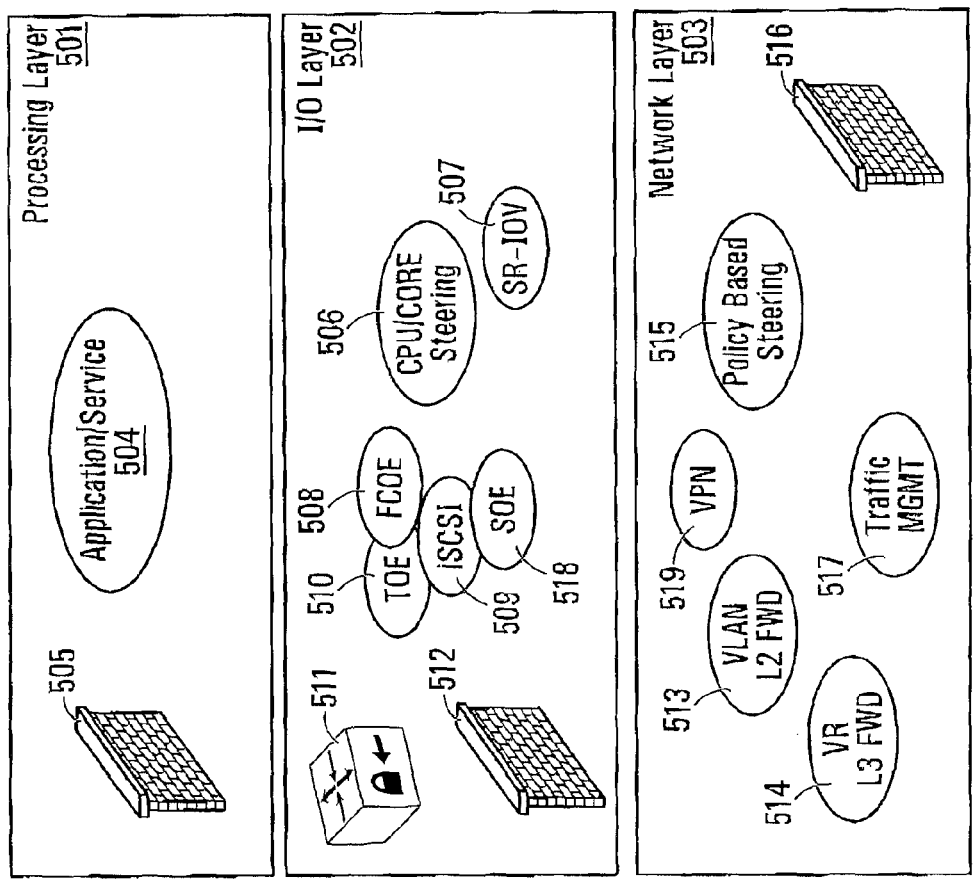
FIG. 6 is a schematic diagram illustrating some examples of IO delivery and/or processing used in each of the layers in accordance with some embodiments of the invention.

FIG. 6 is a schematic diagram illustrating processes supported in each of the three layers, namely the network layer 503, the IO layer 502 and the processing layer 501, described above for processing IO data in and out of the system.

The networking layer 503 is capable of supporting VLAN (virtual local area network) processes 513 for layer 2 link address segregation and layer 2 forwarding. The network layer 503 supports VR (virtual router) processes 514 for layer 3 network address segregation and routing support. The VR processes are also used in conjunction with VPN processes 519 for providing virtualization of networks across systems. The network layer 503 supports policy based steering processes 515 for application specific steering rules. The network layer 503 supports traffic management processes 517 for managing traffic. Security processes 516 are supported in the network to provide static firewall methods and DOS (denial of service) protection. Additional stateful firewall processes or stateless firewall processes, or both, are also deployed in both the IO layer 502 and the processing layer 501. A statefull firewall provides enhanced control and improved security by keeping track of dynamic state and responding appropriately. For example keeping track of a connection being up and in a given state and discarding all packets not relative to that state as a security enhancement. The division of firewall methods is a matter of rule sophistication and scope of the rules.

The IO layer 502 supports processing layer interface capabilities into a virtualized processing environment using Single Root I/O Virtualization (SR-IOV) processes 507. The IO layer 502 supports processing based steering processes 506. The IO layer 502 also supports processing layer offload functionality that would otherwise consume valuable processor layer resources to perform. The offload functionality, in the IO layer, include Fiber Channel over Ethernet (FCOE) 508, SOE 518, and internet Small Computer System Interface (iSCSI) 509 protocol support for storage access, a TOE 510 for Transmission Control Protocol/Internet Protocol (TCP/IP) offload and internet protocol security with secure sockets layer (SSL) (IPSEC/SSL) 511 for offloaded encryption/decryption methods. The IO layer 502 also supports firewall processes 512 more specific to the applications running on the processor entity in the processing layer that is bound to a specific IO device operating in the IO layer 502.

The processing layer 501 is the layer in which applications or services, or both, 504 are executed for operation of the system. In some scenarios these applications are "end of the road" applications where responses to the application requests are sent back to an originator of the request. In other cases, the services in the processing layer 501 are in-band processing intensive networking services for storage, clustering or IO. In-band processing intensive network services include means performing examination and intensive processing on packets routed through a system. An example is encryption of the packets, in which examination of the packet is performed and processing is performed to produce coding that is significantly different than the original packet. The processing layer 501, in either scenario, supports stateful firewall and security processes 505 specific to the applications and/or services 504 executing within the specific processing device.

In an ATCA system, the IO delivery of the system includes several types of different traffic with different latency and bandwidth requirements. The virtualization of ATCA system results in different types of communication being used and segregation of processor entities within the system. This segregation includes networking addressing, network topology, and security between virtual domains. In some embodiments, the use of a logical networking layer as described herein enables IO data delivery in an ATCA chassis from any number of external physical IO ports and speeds to any number of virtualized domains of processor entities and the applications and services that are execute upon them.

Numerous modifications and variations of the present invention are possible in light of the above teachings. It is therefore to be understood that within the scope of the appended claims, the invention may be practiced otherwise than as specifically described herein.

What is claimed is:

1. A method for routing input/output (IO) data in a telecommunication system, the system comprising a network node comprising a plurality of first integrated circuit (IC) cards, a plurality of second IC cards and a switching fabric, each IC card of the plurality of second IC cards connected directly to an IC card of the plurality of first IC cards, each IC card of the plurality of first IC cards connected in a respective slot of the network node, the method comprising:
   receiving the IO data at an external port of any of the plurality of first or second IC cards;
   when packets of the IO data are received at an external port of any of the plurality of second IC cards:
      upon receipt of the packets by a given one of the plurality of second IC cards, the given one of the plurality of second IC cards performing a packet classification of the packets to at least in part determine a destination for the packets;
      delivering the packets to one of the plurality of first or second IC cards identified as a destination according to the packet classification performed by the given one of the plurality of second IC cards via a logical network layer existing on the plurality of first and second IC cards and the switching fabric,
   wherein the logical network layer includes a network device on each IC card of the plurality of first and second IC cards configured to perform packet classification and deliver the packets of the IO data to a destination.

2. The method of claim 1 further comprising:
   at one or more of any of the plurality of first or second IC cards or the switching fabric:
      receiving the packets in the logical network layer; and offloading the packets to an IO layer for processing or to a processing layer for processing via the IO layer.

3. The method of claim 2 wherein offloading the packets to the IO layer for processing comprises at least one of:
 offloading the packets to the IO layer to enable virtualized operating environment support with isolated network addressing and protected traffic types through the use of one or more of: networking layer virtual local area networking (VLAN), virtual routing (VR) and policy based forwarding methods; and
 offloading the packets to the IO layer to enable unification of physical interconnect resources for cluster communications between application services, storage traffic between application and storage devices, and IO traffic between application services and external ports through the use of the network layer.

4. The method of claim 3 further comprising accessing at least one peripheral device within the network node via the logical network layer.

5. The method of claim 1 wherein delivering the packets via the logical network layer to one of the plurality of first or second IC cards identified as a destination comprises at least one of:
 delivering the packets via at least one of the plurality of first IC cards configured as a switching fabric card; and
 delivering the packets via a mesh interconnect connecting together two or more of the plurality of first IC cards.

6. An integrated circuit (IC) card for use in a rear slot location of a network node having a plurality of slots, each slot comprising a front slot location and rear slot location, the IC card comprising:
 at least one external port for receiving IO data;
 at least one internal port for connecting to a corresponding front slot card;
 a network device configured to perform classification of packets of the IO data to at least in part determine a destination for the packets, the network device configured to communicate with network devices in front slot cards and a switching fabric such that collectively the network devices form a logical network layer for delivering the packets of the IO data to a different front slot location card or rear slot location card destination according to classification performed by the network device via the logical network layer.

7. The IC card of claim 6 further comprising at least one IO device configured to offload packets of the IO data for processing.

8. The IC card of claim 7 wherein the at least one IO device is configured to perform at least one of:
 encryption; decryption; encapsulation; decapsulation; deep packet inspection; Transmission Control Protocol (TCP); Fiber Channel over Ethernet (FCOE) processing and internet Small Computer System Interface (iSCSI) processing.

9. An apparatus for routing input/output (IO) data in a telecommunication system comprising:
 a plurality of first integrated circuit (IC) cards;
 a plurality of second IC cards; and
 a switching fabric, each of the plurality of second IC cards connected directly to an IC card of the plurality of first IC cards, each IC card of the plurality of first IC cards connected in a slot of the apparatus;
 wherein at least one of the plurality of second IC cards is configured to receive IO data at an external port;
 upon receipt of packets of the IO data, the at least one of the plurality of second IC cards is configured to perform a packet classification of the packets to at least in part determine a destination for the packets;
 wherein the apparatus is configured to deliver the packets to one of the plurality of first or second IC cards identified as a destination according to the packet classification via a logical network layer existing on the plurality of first and second IC cards and the switching fabric,
 wherein the logical network layer includes a network device on each IC card of the plurality of first and second IC cards configured to perform packet classification and deliver the packets of the IO data to a destination.

10. The apparatus of claim 9, wherein one or more of the plurality of first or second IC cards or the switching fabric are configured to:
 receive the packets in the logical network layer; and
 offload the packets to an IO layer for processing or to a processing layer for processing via the IO layer.

11. The apparatus of claim 9 wherein at least one of the plurality of second IC cards and at least one of the plurality of first IC cards have a network device that is configured to enable delivery of the packets in the logical network layer.

12. The apparatus of claim 9 wherein the switching fabric is comprised of at least one of:
 at least one of the plurality of first IC cards configured as a switching fabric card; and
 a mesh interconnect connecting together two or more of the plurality of first IC cards.

13. The apparatus of claim 9 wherein the apparatus comprises an Advanced Telecommunications Computing Architecture (ACTA) chassis comprising a plurality of slots configured to receive the plurality of first IC cards and the plurality of second IC cards.

14. The apparatus of claim 13 wherein at least one of the plurality of second IC cards is a Rear Transition Module (RTM) card.

15. The apparatus of claim 13 wherein:
 at least one of the plurality of first IC cards is one of: an application/service card; an IO connector card; and a data storage card.

16. The apparatus of claim 9 wherein one of the plurality of second IC cards and one of the plurality of first IC cards connected directly together in the same slot are the same card type and use the logical network layer to deliver packets to other of the plurality of first and second IC cards.

17. The apparatus of claim 10 wherein at least one of the plurality of first IC cards and plurality of second IC cards comprises at least one offload device configured to operate in the IO layer.

18. The apparatus of claim 17 wherein the at least one offload device is configured to perform at least one of:
 encryption; decryption; encapsulation; decapsulation; deep packet inspection; Transmission Control Protocol (TCP); Fiber Channel over Ethernet (FCOE) processing and internet Small Computer System Interface (iSCSI) processing.

19. The apparatus of claim 9 wherein the network devices are compliant with one or more of: IEEE 802.1p, IEEE 802.1Qua, IEEE 802.az, IEEE 802.1bb, and PCI-E.

20. The apparatus of claim 9, wherein a subset of the plurality of the second IC cards are configured to monitor and debug any IO port, internal or external on any other one of the plurality of first or second IC cards in the apparatus.

* * * * *